March 24, 1970   R. T. HOLLINGSWORTH   3,501,854
MULTIPLICATION CARD-COMBINATION ARRAY
Filed May 1, 1968   4 Sheets-Sheet 1

INVENTOR.
RAFT T. HOLLINGSWORTH
BY
Robert W. Beach
ATTORNEY

March 24, 1970  R. T. HOLLINGSWORTH  3,501,854
MULTIPLICATION CARD-COMBINATION ARRAY
Filed May 1, 1968  4 Sheets-Sheet 2

INVENTOR.
RAFT T. HOLLINGSWORTH

BY Robert W. Beach

ATTORNEY

March 24, 1970   R. T. HOLLINGSWORTH   3,501,854
MULTIPLICATION CARD-COMBINATION ARRAY
Filed May 1, 1968   4 Sheets-Sheet 3

INVENTOR.
RAFT T. HOLLINGSWORTH
BY
ATTORNEY

March 24, 1970     R. T. HOLLINGSWORTH     3,501,854

MULTIPLICATION CARD-COMBINATION ARRAY

Filed May 1, 1968     4 Sheets-Sheet 4

INVENTOR.
RAFT T. HOLLINGSWORTH

BY Robert W. Beach

ATTORNEY

United States Patent Office 3,501,854
Patented Mar. 24, 1970

3,501,854
MULTIPLICATION CARD-COMBINATION ARRAY
Raft T. Hollingsworth, 10604 E. Marginal Way S.,
Seattle, Wash. 98168
Filed May 1, 1968, Ser. No. 725,864
Int. Cl. G09b 23/02
U.S. Cl. 35—31                                            7 Claims

ABSTRACT OF THE DISCLOSURE

Individual cards bear a multiplier and a multiplicand in a corner and their product in the central portion with diagonal lines separating the units, tens and hundreds columns of the product. The cards are combined in an array to perform complex multiplication operations by placing such cards in columns and rows so that the diagonal lines cooperate to define diagonal columns of numbers which extend in continuity across the array.

---

It is a principal object of the present invention to provide an educational device for teaching children multiplication processes readily and pleasantly.

A further important object is to provide such an educational device which children can manipulate without adult supervision after initial instruction and thereby afford readily available means for multiplication practice.

An additional object is to provide visual representation of multiplication principles which afford more complete understanding of the multiplication operations.

Children have traditionally learned to multiply through rote memorization of multiplication tables and of a particular procedure for writing down a problem and multiplying the multiplicand and the multiplier to obtain a product. Consequently, when faced with a problem involving relatively large numbers, a child is frequently overwhelmed and attacks such a problem with an attitude of drudgery and despair. Each individual card of the present invention portrays a different statement of a multiplication table, but, unlike such table, the cards can be manipulated to select and combine them in an infinite number of arrays representing different multiplication problems so as to demonstrate to a child the characteristics of the table and its use. In addition, the cards can be used to solve such multiplication problems quickly and easily by combining the cards according to basic mathematical principles so that a child can practice doing problems either alone or by playing competitive games with other children.

Figure 1:
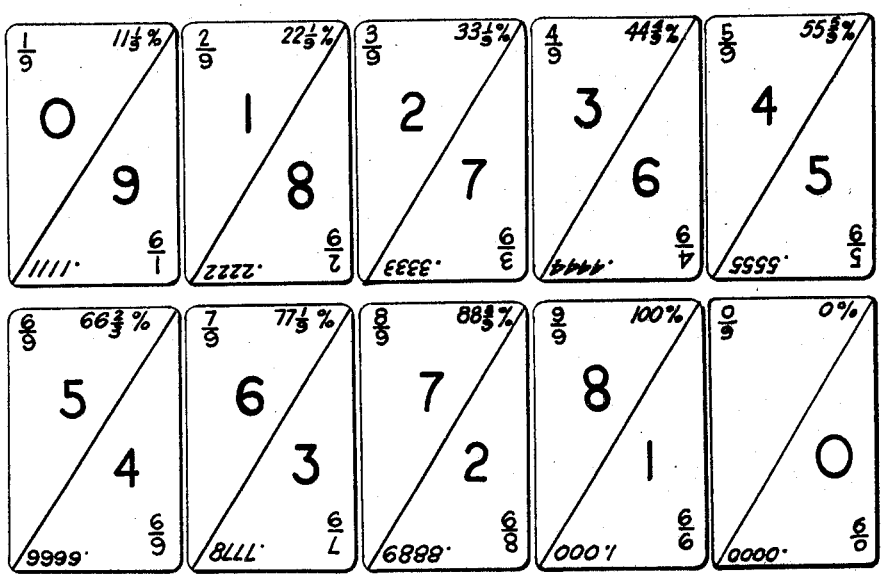
FIGURE 1 is a plan of one set of cards representing a portion of a particular pack of cards of the present invention which pack represents a portion of the multiplication table.

Each card bears two factors and their product. For convenience, the factors are arranged, in the upper left and lower right corners of the cards shown in the drawings, in the form of a fraction. In order to avoid confusion by adding reference numerals to the drawings, the cards are identified herein by these factor fractions. Representative cards of a pack are shown in FIGURE 1, characterized by each factor being a single digit. The digits representing the product in the central portion of the cards are read from left to right as usual, but such digits are arranged along an imaginary diagonal line extending from the upper left corner to the lower right corner of the card. Each card is divided by a diagonal line extending from the upper right corner to the lower left corner which separates the product digits so that they are arranged in diagonal columns representing the units column and the tens column. If the product has only a units digit, the digit "0" may appear as in the card 1/9 or may be implied by a blank as in the tens column of card 0/9. Although a column usually implies vertical orientation, as will be seen the region between adjacent diagonal lines corresponds to a column of digits in a normal multiplication problem-solving setup. Therefore, such regions are hereinafter designated "diagonal columns." Additional mathematical data can be illustrated on the cards if desired, such as the decimal and percentage equivalents of the factor fractions shown on the cards of FIGURE 1.

It is preferred that a child be started with a first pack containing cards representing the multiplication table of the first nine integers multiplied by the integers 0 through 9. Consequently, the pack would include ninety cards made up of nine sets of ten cards each. One complete set, representing the 9-multiplier set, is shown in FIGURE 1 arranged in the sequence which would appear in a multiplication table. Each of the ten cards has the common denominator multiplier 9. The pack would contain eight more sets for the multipliers 1 through 8, respectively. The numerator of each card in a set, representing the multiplicand, would be different and would be one of the digits 0 through 9. To provide greater multiplication flexibility the pack of cards may also include a card having a multiplier, multiplicand and product of 0.

Figure 2:
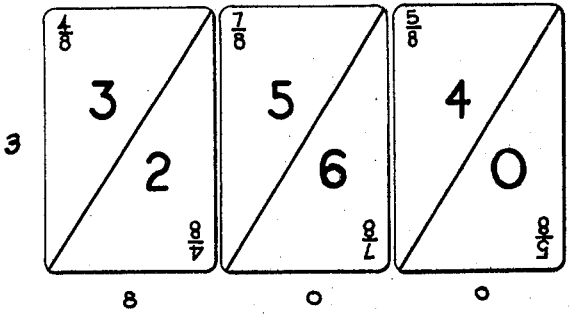
FIGURE 2 is a plan of a card-combination array of a portion of a different set for solving a representative multiplication problem.
Figure 3:
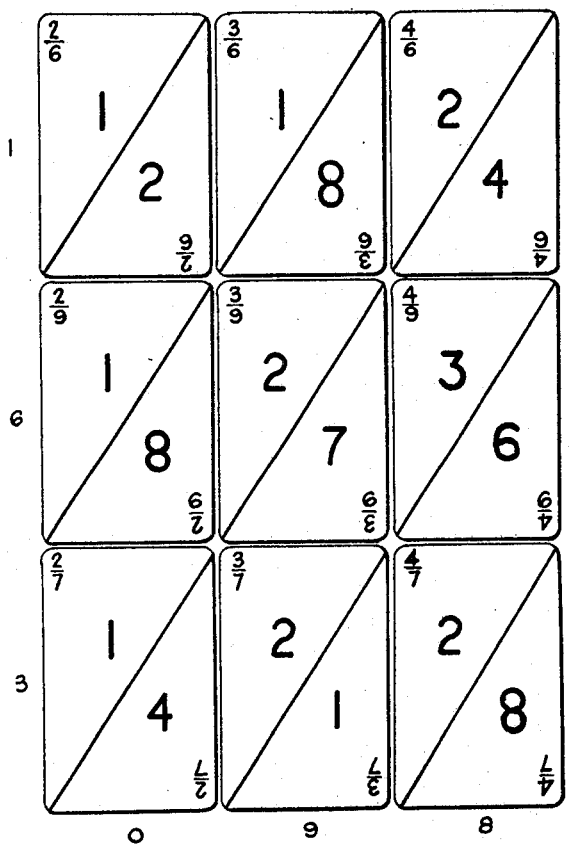
FIGURE 3 is a plan of a card-combination array combining cards of several sets for solving a different, more complex multiplication problem.

FIGURES 2 and 3 show some of the cards of such pack combined in an array to perform representative multiplication problems. In FIGURE 2 an array of three cards in a row represents a problem having a three-digit multiplicand and a one-digit multiplier. The hundreds, tens and units digits of the multiplicand are represented by the combined numerators of the three cards 4/8, 7/8 and 5/8 reading from left to right, giving the multiplicand 475. The multiplier is represented by the common denominator 8 of the three cards. The product of the problem 8×475 is determined by adding from right to left the digits in the diagonal units, tens, hundreds and thousands columns defined by the diagonal lines on the cards combined in the problem array. In the units column only the digit 0 appears, so that the child would write "0" in the units position on his answer sheet. In the tens column formed by the cards 7/8 and 5/8 in combination appear the digits 6 and 4 which would be added to obtain 10. The child would enter a "0" in the tens position and carry the "1" to be added with the hundreds column. He then adds the "1" which he carried to the 5 and 2 in the hundreds column formed by the cards 4/8 and 7/8 in combination to obtain "8" for the hundreds position in his answer. Since only the digit 3 appears in the thousands column, he simply carries the digit to the thousands position in his answer, giving the final product of 3800.

If the child were to write out the problem on a sheet of paper instead of using the cards, he might work the problem in the following manner:

EXAMPLE 1

```
  475
    8
  ---
   40
   56
   32
  ----
 3800
```

It will be evident that the three components added to give the final product correspond to the three products which appear, respectively, on the three cards of the problem array shown in FIGURE 2, offset progressively to the left. The arrangement of the cards in the array, therefore demonstrates physically to the child the need for memorizing the products of the individual propositions 8×5, 8×7, and 8×4 and for offsetting the respective products "40," "56" and "32" when adding them. By use of the cards the child can see immediately the relationship of the individual multiplication table entries to the solution of a complete problem; and the concept of the place value of the decimal number system is visually supplied by the diagonal columns of the array of cards, such as the units, tens, hundreds and thousands places.

At first, an adult or older child must set up the array for the learning child, but as he begins to understand the principles of multiplication, he will be able to set up the array himself. Consequently, the child is automatically encouraged to learn the necessary mathematical relationships in his zeal to be able to manipulate the cards by himself. At the same time he recognizes the direct application of the elementary products in a multiplication table rather than simply learning by rote a large number of mathematical facts which seem to him at first to be unrelated. He is also given a flexible means for learning such multiplication facts by being able to take a pack of cards arranged at random, picking a card, learning the relationship appearing on such card, and then picking another card and so on. Consequently, he is not limited or hampered by the fixed order presented to him in a printed mathematical table.

While, as shown in FIGURE 2, for example, the cards must be combined in an array forming at least one line to represent a problem, such line need not be a row as shown in that figure but could be a column, as long as the cards are juxtaposed to dispose a diagonal column of one card containing a product digit in alignment with at least a portion of a diagonal column of an adjacent card containing a product digit to form a composite diagonal column. The sum of the product digits in such a composite diagonal column will be a digit of the product of two multiplication problem factors one of which is formed by the common factors of the row cards and the other of which is formed by the common factors of the column cards except when such a sum of the previous composite diagonal column digits exceeds "9" so that it is necessary to carry a number. If the same cards 4/8, 7/8 and 5/8 were rearranged in a column in such descending order the product answer of 3800 would be the same because 475×8 is the same as 8×475, which rearrangement demonstrates to a child the commutative property of multiplication.

By using the cards of the present invention, the child can readily learn to perform multiplication problems of increasing difficulty. The array of cards in FIGURE 3 portrays a representative problem having the three-digit multiplicand 234, reading the numerators of the fractions from left to right in each row of the array, and the three-digit multiplier 697, reading downward the denominators of the fractions in each column of the array. Thus, each column of cards in the array of FIGURE 3 corresponds to one digit of the multiplier. The fraction on each card in a selected column has the same numerator, which is the corresponding digit of the multiplicand. In the left column, for example, each card 2/6, 2/9, 2/7 has the numerator "2" corresponding to the left or hundreds digit in the multiplicand "234." The fractions on all the cards in each row has the same denominator, corresponding to a digit of the multiplier. In the top row, for example, each card 2/6, 3/6, 4/6 has the denominator "6" corresponding to the first or hundreds digit in the multiplier "697."

The solution to this problem again is obtained simply by adding the digits in the respective diagonal columns progressing from the lower right column to the upper left column of the array, which columns are defined by cooperative alignment of the diagonal lines on the cards combined in the problem array. The solution is then tabulated to the left from the units digit at the right in the same sequence as would be followed in solving the problem conventionally, giving the product of 163,098 as shown in FIGURE 3 at the lower ends of the diagonal columns.

Figure 4:
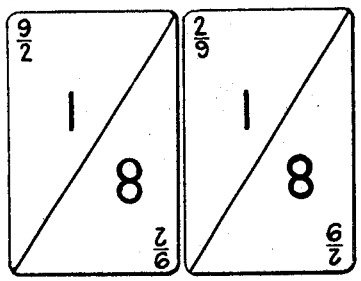
FIGURE 4 is a plan of one card from each of two sets and having a common product.

In a pack of ninety cards, the set of cards representing the multiplication table having the multiplier "2" would include a card 9/2 as shown in FIGURE 4, and the set representing the multiplication table having the multiplier "9" would include a card 2/9. Since both cards would bear the same product "18," the cards also clearly show the commutative property of multiplication. To help the child grasp this concept that both 2 and 9 are simply factors of 18 irrespective of which is the multiplier, when he has assimilated the fact that both 2×9 and 9×2 equals 18, he can be encouraged to replace card 2/9, which is the first card of the second row in the array shown in FIGURE 3, for example, with the card 9/2.

In order to make such a substitution with confidence the child must have learned first, that one factor is always formed by the columns of the array, reading from left to right; second, that at least one of the numbers of all the fractions in each column must be the same and that common number is the corresponding digit of one of the factors; third, that the other factor is always formed by the rows of the array, reading from top to bottom; and fourth, that at least one of the numbers of all the fractions in each row must be the same and that common number is the corresponding digit of such other factor. Thus, in the problem represented by the array of FIGURE 3 the cards of the top row could bear the fractions 2/6, 3/6 and 6/4 to provide the thousands multiplier digit "6"; the cards of the second row could bear the fractions 2/9, 9/3 and 4/9 to provide the multiplier digit "9"; and the cards of the bottom row could bear the fractions 2/7, 3/7 and 7/4 to provide the multiplier digit "7" without changing the answer to the problem. After the child has learned these relationships, the problem 234×699 could be performed, for example, by replacing the last row of cards in FIGURE 3 with the cards 9/2, 9/3, 9/4, on which cards would appear the products 18, 27, 36 respectively corresponding to the products appearing on the cards in the second row of FIGURE 3. While the size of the pack of cards could be reduced by removing one of each pair of cards of the type shown in FIGURE 4, that would mean that no problem array could be arranged for a factor having two digits which are the same. If desired a single pack including two sets of cards having the same multiplier could be provided for solving problems in which two digits of a factor are the same.

Figure 6:
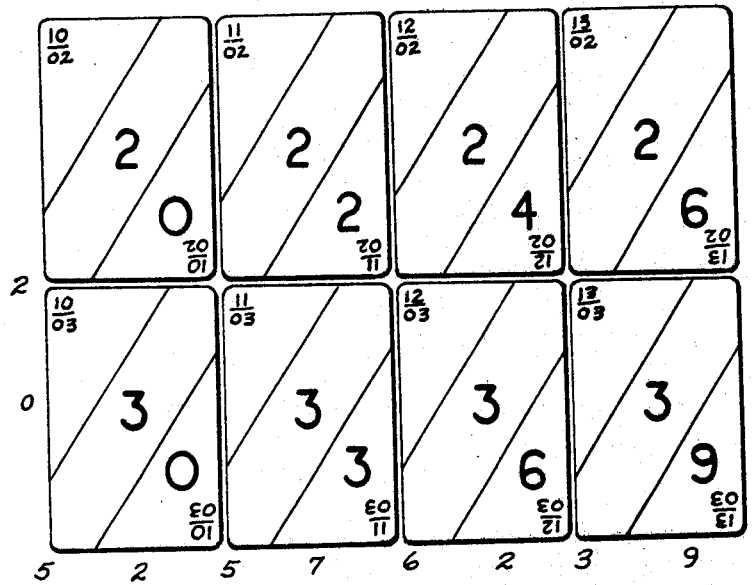
FIGURE 6 is a plan of a card-combination array of supplemental cards of the type shown in FIGURE 5 for solving a representative multiplication problem.
Figure 5:
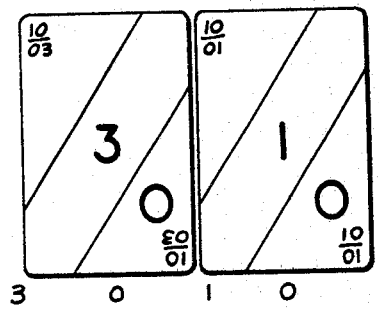
FIGURE 5 is a plan of representative supplemental cards for solving problems of higher numerical order.

In order to solve a problem in which the multiplier and/or the multiplicand includes "0," cards of the type shown in FIGURES 5 and 6 may be provided in which the card is divided by diagonal lines into three diagonal columns, the upper left column being blank, which blank column implies the integer 0. FIGURE 5 illustrates the use of such cards in the very simple problem of 10×301. Such a problem can be written:

EXAMPLE 2

```
   10
   10
  301
  ‾‾
   00
   30
 ‾‾‾‾
 3010
```

Again the products "10" and "30" are seen to correspond to the products on the respective cards of FIGURE 5. The effect of the blank space at the upper left of card 10/01 in the array is to shift the "30" product on the left card two places, that is from the units to the hundreds, instead of only one place if the zero before the "1" on card 10/01 were omitted so that the factor would be "31" instead of "301." Thus the child would come to recognize that the presence of the "zero" in the multiplier simply effects shifting of the position of the product of 3×10 to the hundreds and thousands column corresponding to the position of "3" in the hundreds position of the multiplier.

As indicated in FIGURE 6, cards can be provided which bear multiplicands of two digits. Such cards can be combined to form an array representing a problem having a large multiplier using fewer cards. The array shown provides a solution to the problem 203×10,111,213 using only eight cards with four cards arranged in each of two rows, giving the product 2,052,576,239 as shown.

Figure 7:
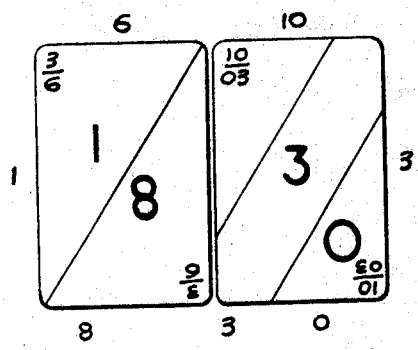
FIGURE 7 is a plan of a card-combination array combining cards of the pack with supplemental cards for solving a representative multiplication problem.

The example in FIGURE 7 of the problem $$3 \times 610 = 1,830$$

illustrates that two-column cards of the type shown in FIGURES 1 through 4 can be readily combined with three-column cards of the type shown in FIGURES 5 and 6. The commutative property of multiplication as discussed above is shown in this figure. Both cards have a common factor "3" in a row corresponding to one factor, such common factor appearing in the numerator, i.e. as the multiplicand, on card 3/6 and as the denominator, i.e. as the multiplier, on card 10/03. The other factor is formed by other numbers in the two columns, namely, 6 and 10, combining to 610. The product, as before, is the sum of the numbers in the diagonal columns. Consequently, a child using the cards again is shown that the order of the factors on an individual product card is not critical.

Figure 8:
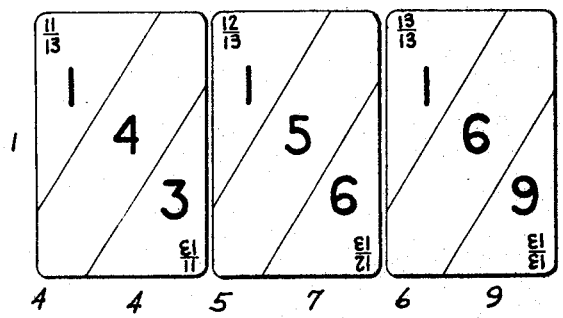
FIGURE 8 is a plan of representative supplemental cards of higher order which may be combined in an array to solve a representative multiplication problem.

FIGURE 8 shows examples of product cards in which both factors are two-digit numbers, which factors have three-column products. The array of these cards represents the problem 13×111,213, which problem is solved by an array of only three cards instead of the twelve cards which would be required using the single-digit factor, two-column product cards of FIGURE 1. Such twelve cards could be a top row of cards 1/1, 1/1, 1/1, 2/1, 1/1 and 3/1 and a bottom row of cards 1/3, 1/3, 1/3, 2/3, 1/3 and 3/3. In both cases the product is 1,445,769, but in the latter array of twelve cards, four sets having a 1-multiplier and four sets having a 3-multiplier would be required in the pack.

It is contemplated, however, that although the number and range of individual product cards could be extended indefinitely, the usual teaching pack would include ninety cards representing the multiplication table through "9." Auxiliary sets of cards having factors through "12," "13," or "15" may be provided for use with the basic pack, for example. A few cards of the three-column type shown in FIGURES 5 and 6 may be provided to be used in teaching the role of "zero" in multiplication problems.

I claim:

1. An arithmetic teaching device comprising a combination of cards juxtaposed in an array, each card bearing a pair of factors, digits representing the product of said factors and a diagonal line interposed between adjacent digits of said product and defining diagonal columns containing said digits, said card-combination array including a line of cards all of which cards bear a common factor, and a composite diagonal column formed by a diagonal column of one card containing a product digit in alignment with at least a portion of a diagonal column of an adjacent card containing a product digit, for addition of such product digits.

2. The mathematical teaching device defined in claim 1, in which the pair of factors is represented as a fraction having a numerator and a denominator.

3. The mathematical teaching device defined in claim 2, in which the array includes a column of juxtaposed cards the factor fractions of which have a common numerator.

4. The mathematical teaching device defined in claim 2, in which the array includes a row of juxtaposed cards the factor fractions of which have a common denominator.

5. The mathematical teaching device defined in claim 1, in which the card array includes cards juxtaposed in a plurality of rows and columns, the cards forming each row having a common factor and the combination of such row common factors constituting one factor of a multiplication problem represented by such card combination array, and the cards forming each column having a common factor and the combination of such column common factors constituting another factor of said multiplication problem.

6. The mathematical teaching device defined in claim 5, in which the sum of the product digits in the composite diagonal column is a digit of the product of the two factors of the multiplication problem.

7. The mathematical teaching device defined in claim 1, in which one of the cards bears a plurality of parallel diagonal lines forming at least three diagonal columns.

References Cited

UNITED STATES PATENTS

| | | | |
|---|---|---|---|
| 2,198,670 | 4/1940 | Johnson | 273—152.7 |
| 2,205,440 | 6/1940 | Schoenberg et al. | 35—31 |

FOREIGN PATENTS

A.D. 10,470  1906  Great Britain.

EUGENE R. CAPOZIO, Primary Examiner

W. H. GRIEB, Assistant Examiner

U.S. Cl. X.R.

35—70; 273—152.7